Dec. 13, 1966   F. H. GINDROZ, JR   3,290,951
QUICK REVERSING MECHANISM
Filed Nov. 13, 1964   3 Sheets-Sheet 2
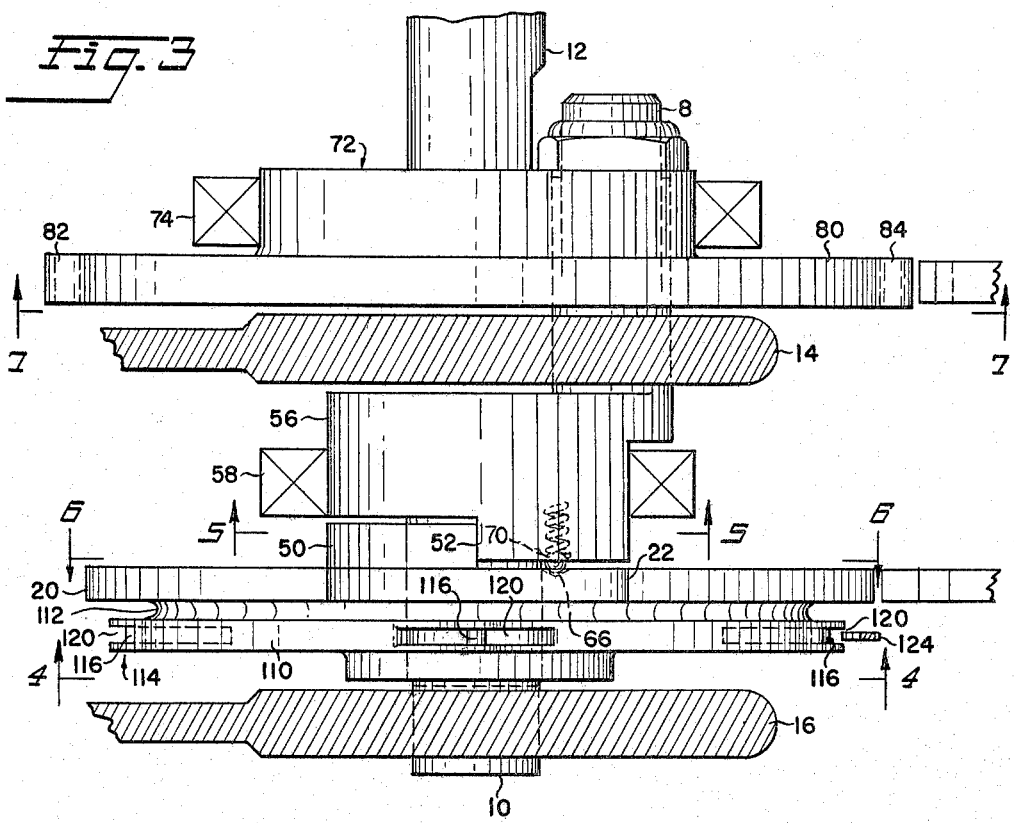
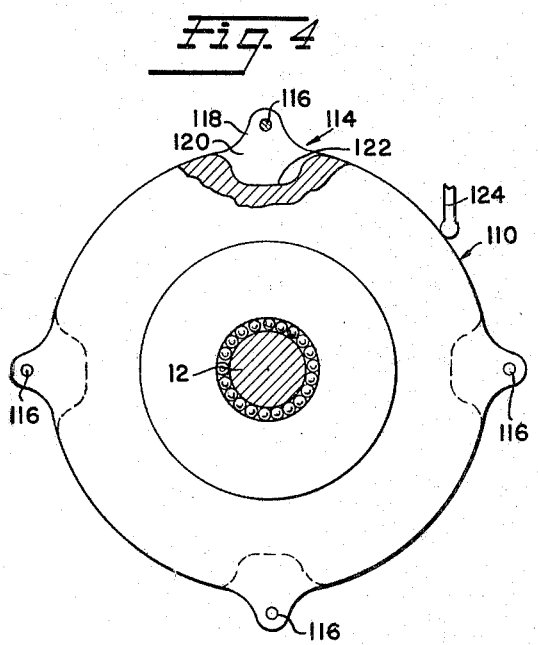
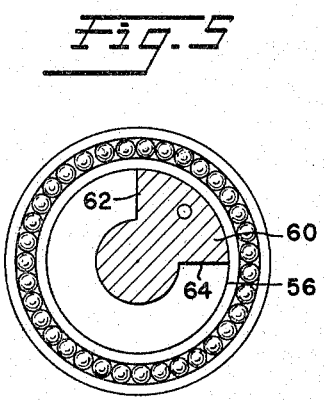
INVENTOR
FRANCIS H. GINDROZ JR.
BY
Scrivener Parker Scrivener & Clarke
ATTORNEYS

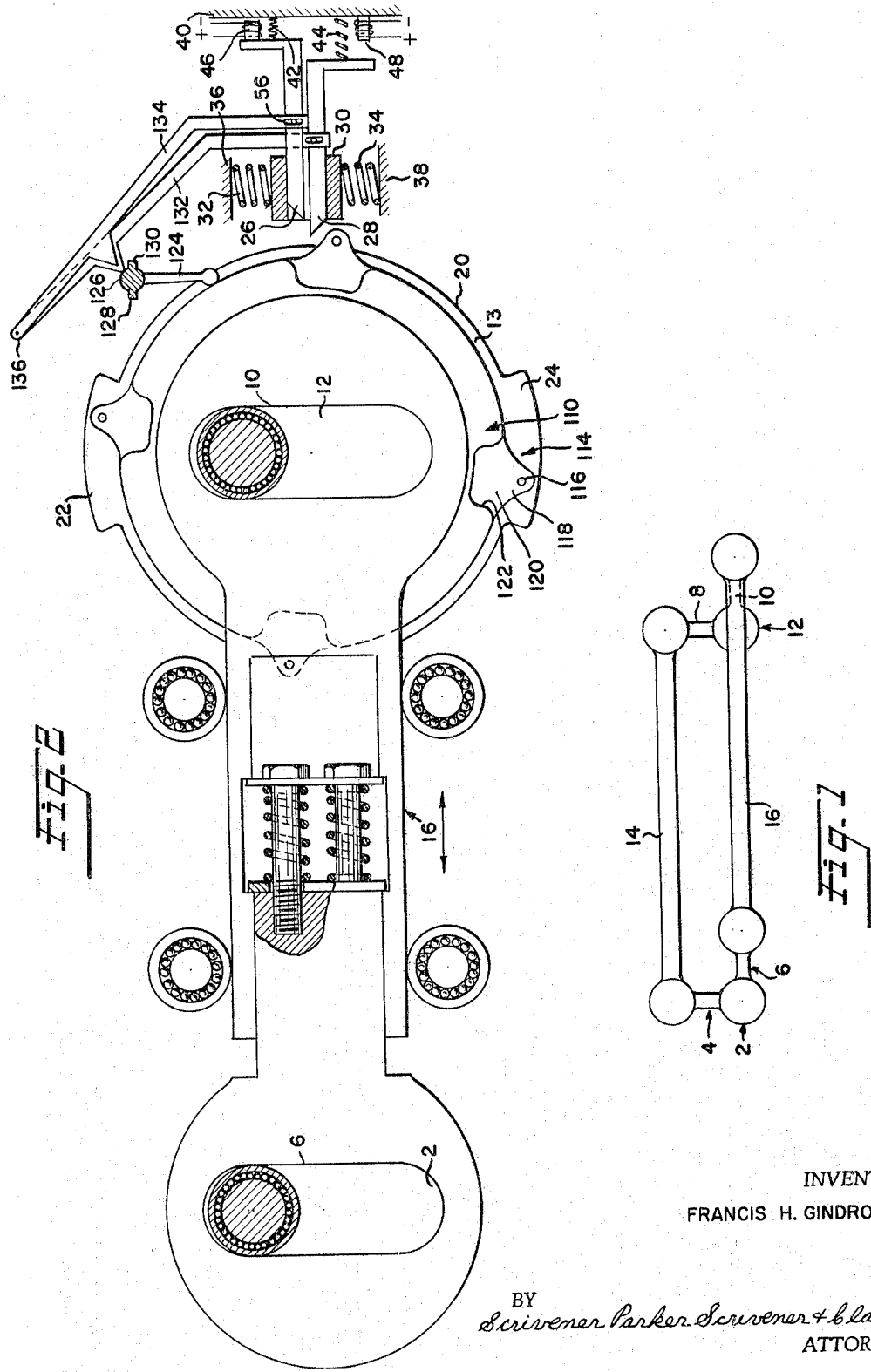

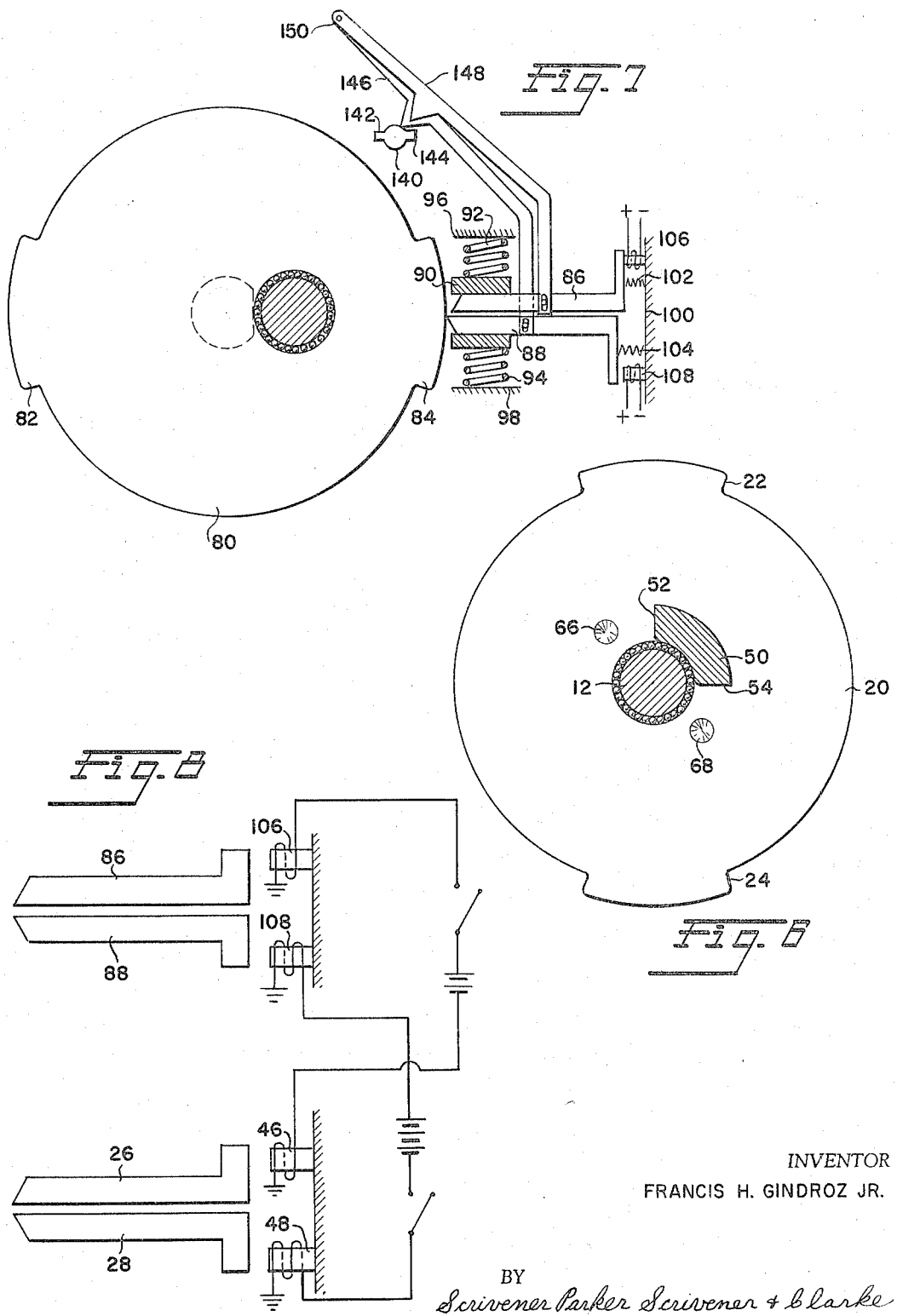

United States Patent Office 3,290,951
Patented Dec. 13, 1966

3,290,951
QUICK REVERSING MECHANISM
Francis H. Gindroz, Jr., Torrance, Calif., assignor to Electronic Specialty Co., Los Angeles, Calif., a corporation of California
Filed Nov. 13, 1964, Ser. No. 411,072
8 Claims. (Cl. 74—68)

This invention relates to mechanical movements and, more particularly, to improved means for rapidly reversing the direction of rotation of the output shaft of a mechanical drive of the crank-link-crank type without reversing the direction of rotation of the prime mover.

A mechanical drive of the crank-link-crank type comprises drive and driven shafts, and input and output cranks connected respectively to the two shafts and themselves connected by a link which imparts to the output crank rotary motion derived from the positively driven input crank. If the radial lengths of the crank arms between the centers of rotation of the cranks and the respective ends of the link are identical it will be apparent that as the output crank member is rotated in one direction the connecting link will be moved into alignment with the centers of rotation of the cranks twice in each 360° of movement, and when the link is in either of these positions the output crank may then be rotated either in the same direction as the input member or may assume a crossed driving position in which, as the input member continues its rotation in the same direction, the output crank is driven in the opposite direction. This "dead spot" condition occurs twice during each revolution of the input member at positions 180° apart. It has accordingly been the principal object of the present invention to provide new and improved means for reversing the direction of rotation of the driven shaft which takes advantage of the dead spot condition to effect such reversal without reversal of the direction of rotation of the input member.

The invention provides new and improved means for controlling, by selectively reversing, the direction of rotation of a continuously rotating shaft which is driven, through cranks and connecting links, by a first shaft. In the usual reversing mechanism of the type to which the invention relates, such as that described and claimed in my United States Letters Patent No. 3,139,761 for Quick Reversing Mechanism, a single drive shaft crank is connected to a single driven shaft crank by a single connecting link, and means are provided for selectively applying a directional force to the driven shaft crank at and adjacent the dead spot to effect reversal of rotation of the driven shaft when desired.

The invention is described in the following specification and is illustrated in the accompanying drawing, in which:

FIG. 1 is a schematic view illustrating the driving means of the type of the present invention;

FIG. 2 is a side elevational view showing the means provided by the invention for connecting the auxiliary driven shaft crank to the driven shaft and for reversing the direction of rotation thereof;

FIG. 3 is a top plan view of the parts shown in elevation in FIG. 2;

FIGS. 4, 5, 6 and 7 are views taken on lines 4—4, 5—5, 6—6 and 7—7 of FIG. 3, and FIG. 8 is a diagram of the electrical circuits for the operating solenoids for the latching dogs.

In accordance with the present invention two drive shaft cranks and two driven shaft cranks are provided and the invention consists in the provision of new and improved means associated with one of the driven shaft cranks to effect selective reversal of rotation of the driven shaft. FIG. 1 of the drawings is a schematic illustration of the invention and shows drive shaft 2 having cranks 4, 6 fixed thereto and spaced 90° with respect to each other, although another angle may be used, it being understood that by "fixed" it is meant that neither crank can rotate with respect to the shaft. These cranks are connected, respectively, to cranks 8, 10 on driven shaft 12 by connecting links 14, 16. Driven shaft crank 8, which is referred to as the main or fixed driven shaft crank, is fixed to the driven shaft 12, while crank 10, which is known as the auxiliary driven shaft crank is mounted on the driven shaft in a normal position displaced 90° (in the embodiment being described) with respect to the main crank 8 but is connected to the driven shaft by means which permit it to rotate with respect to the driven shaft through an angle twice that of the angular displacement of the cranks, or 180° in the embodiment being described. It will be apparent that the driven shaft cranks cannot lie in the "dead spot" at the same time because of their angular displacement. Thus, in the operation of the mechanism so far described two fixed input shaft cranks drive two connecting rods, one of which drives the output shaft by a fixed crank at all times except when the crank lies in one or the other of the dead spot positions, at which times the second, or auxiliary driven shaft crank drives the output shaft. When the auxiliary crank lies in either of the dead spot positions the fixed, or main, crank drives the output shaft and the auxiliary crank is carried through in continuing rotary movement. The means for reversing the direction of rotation of the driven shaft are associated with the means which connect the auxiliary crank to the output shaft, and these means will now be described.

Means are provided by the invention for exerting pressure on the auxiliary crank at the dead spot position and in a direction opposite to the present direction of rotation of the crank in order to cause it to rotate in the opposite direction. Such means are particularly shown in FIGS. 2 and 6 and comprise, first, the auxiliary latching plate 20 which is mounted on and concentric with the driven shaft 12 and is connected to the auxiliary crank 10 for rotation therewith. As particularly shown in FIG. 6, this plate is a circular disk which is provided at its periphery with two diametrically opposed latching lugs 22, 24 which extend radially outwardly from the periphery of the latching plate and in the plane thereof. It will be apparent that force exerted in the proper circumferential direction on either of these latching lugs will oppose rotation of the latching plate and the auxiliary crank.

Means are provided by the invention for exerting opposing force in either of two directions on the rotating auxiliary latching plate and auxiliary crank, and such means comprise, first, two latching dogs 26, 28 which are supported for horizontal sliding movement toward and away from the latching plate in a floating block 30. Compression springs 32, 34 are positioned, respectively, between the upper and lower surfaces of block 30 and fixed support members 36, 38 and the springs therefor provide the sole support for the block. The two latching dogs are positioned one above the other and closely together and the leading end of each dog is beveled so that the two leading ends converge toward the meeting plane of the two dogs. This meeting plane is positioned in the dead spot of the driven shaft cranks, and in the disclosed embodiment of the invention it is positioned in the outside dead spot, which is the one on the side of the driven shaft away from the drive shaft. The outer ends of the latching dogs are positioned adjacent a fixed vertical support 40 and compression springs 42, 44 are interposed between the support and the ends of the dogs and constantly urge the dogs in the direction of the latching plate. Solenoids 46, 48 are mounted on the support 40 and are, respectively, operatively positioned with respect to the adjacent ends of the dogs 26, 28 so that energization of either solenoid will move the associated dog against the force of the compression spring in a direction away from the latching plate. As stated, the auxiliary latching dogs 26, 28 are positioned in the plane of the latching plate and are adapted and intended to cooperate with the lugs 22, 24 on that plate in the operation of the mechanism in a manner to be described.

As described above, the auxiliary latching plate 20 is drivingly connected to the auxiliary driven shaft crank 10 which, in turn, is rotatable through a limited arc with respect to the driven shaft, and means are provided by the invention for limiting the relative rotational movement of the driven shaft and the auxiliary crank 10 to an angle twice the angular displacement of the two driven shaft cranks. In the embodiment of the invention being described the cranks are displaced by 90° and the angular movement of the auxiliary crank with respect to the driven shaft is therefore limited to 180°. As particularly shown in FIG. 6, the auxiliary latching plate is provided with an integrally formed driving lug 50 which is positioned centrally thereof and has radial surfaces 52, 54 which are disposed at 90° to each other. Positioned adjacent the auxiliary latching plate 50 is the driven shaft hub 56 which comprises a member of generally circular external shape keyed to driven shaft 12 and externally supported by bearings 58. As particularly shown in FIG. 5, this hub is provided with a driven lug 60 having radial edges 62, 64 which are disposed at 90° to each other and which are operatively positioned to be engaged by the radial surfaces 52, 54 of the driving lug 50 of the auxiliary latching plate, and it will be seen that the two pairs of surfaces are so positioned and related to each other that 180° of relative movement is permitted between the auxiliary latching plate and the driven shaft hub. Releasable holding means are provided between the auxiliary latching plate and the driven shaft hub and comprises two recesses 66, 68 in the inboard surface of the latching plate which are disposed at 180° to each other and equidistantly spaced from the radial driving surfaces 52, 54, and a spring-pressed ball 70 which partially protrudes from the outboard surface of the driven lug part 60 of the driven shaft hub. The main driven shaft crank 8 is fixed to driven shaft hub 56 eccentrically of driven shaft 12 as particularly shown in FIG. 3, and is therefore fixed to the driven shaft by the hub. The main crank extends from the hub parallel to the driven shaft and is operatively connected to the main latching plate, to be described, and extends through a collar 72 on the main latching plate and which is supported by bearings 74.

Means are provided by the invention for exerting pressure on the main driven shaft crank to reverse the direction of rotation thereof following reversal of the direction of rotation of the auxiliary driven shaft crank. These means are particularly shown in FIGS. 1 and 7 and comprise the main latching plate 80 which is a generally circular disk keyed to the driven shaft and provided on its periphery with two diametrically opposite latching lugs 82, 84 which extend radially outwardly from the periphery of the latching plate and in the plane thereof, and which are, respectively, positioned at 90° to the two lugs 22, 24 of the auxiliary latching plate 20. Adjacent and outside the periphery of the main latching plate and in the plane thereof are mounted the main latching dogs 86, 88 which have the same construction, associated parts, operation and function as the auxiliary latching dogs which are described above. These two latching dogs are positioned one above the other and closely together and the leading end of each dog is beveled so that the two leading ends converge toward the meeting plane of the two dogs. This meeting plane is positioned in the dead spot of the driven shaft cranks, and in the disclosed embodiment of the invention it is positioned in the outside dead spot, which is the one on the side of the driven shaft away from the drive shaft. The latching dogs are slidably mounted for horizontal sliding movement toward and away from the main latching plate in a floating block 90. Compression springs 92, 94 are positioned, respectively, between the upper and lower surfaces of block 90 and fixed support members 96, 98 and the springs therefor provide the sole support for the block.

The ends of the dogs away from the main latching plate are positioned adjacent a support 100 and compression springs 102, 104 are positioned between the ends of the dogs and the support and constantly urge the dogs toward the latching plate. Solenoids 106, 108 are mounted on support 90 and are, respectively, associated with the two latching dogs and are selectively operable to move one or the other or both of the dogs against the force of its associated spring out of the path of the lugs on the main latching plate. As shown in FIG. 8, solenoids 106 and 46 which, respectively, control the upper main and auxiliary latching dogs 86, 26 are connected in circuit for simultaneous energization and de-energization, as are also solenoids 108 and 48 which control the lower main and auxiliary latching dogs 88, 28.

Means are provided by the invention for returning the auxiliary and main latching dogs to their inoperative positions after being moved to operative position in the paths of the lugs of the auxiliary and main latching plates in a direction-reversing operation. Such means comprise a directional sensing plate 110 which is mounted on and concentric with the driven shaft and is connected to the auxiliary driven shaft crank 10 and to the auxiliary latching plate 20, and is particularly shown in FIG. 4. Spaced about the periphery of the sensing plate at 90° intervals are parts of four "Geneva lock" mechanisms 114 of conventional construction, each of which comprises a pin 116 which extends axially of the disk and is supported by ears 118 which protrude radially from the general periphery of the disk, and radially inward of which is a recess 120 defined on its inward side by wall 122. Bearing on the outer periphery of the sensing plate is the outer rounded end of a follower rod 124 the other end of which is connected to camshaft 126 from which cams 128, 130 extend outwardly in diametrically opposite directions. It will be seen that if the directional sensing plate is rotating in such a direction that the follower rod is in trailing position, as would be the case if the plate were rotating in a clockwise direction and the follower rod were in the position shown in FIG. 2, the camshaft 126 will be subjected only to a slight rocking motion as the pins 116 of the Geneva lock mechanism pass under the end of the follower rod. However, if the direction of rotation of the sensing plate is reversed the end of the follower rod will pass under the Geneva lock pin and will be forced into the slot under the pin thereby turning the camshaft to its reverse trailing position. In other words, the position of the camshaft 126 is always responsive to and indicative of the direction of rotation of the sensing plate and therefore of the auxiliary driven shaft crank 10. Bearing on the upper surfaces of the cams 128, 130 are parts which depend from the intermediate parts of two latching dog levers 132, 134 which are connected at their lower ends to the auxiliary latching dogs 26, 28, respectively, through lost motion connections. The upper ends of the levers are pivotally supported as shown at 136. The camshaft 126 also carries a second cam 140 adjacent the periphery of the main latching plate 80 having opposed cams 142, 144 on which bear parts which depend from the intermediate parts of two latching dog levers 146, 148 which are connected at their lower ends to the main latching dogs 86, 88 respectively, through lost motion connections. The upper ends of the levers are pivotally supported as shown at 150.

*Operation*

The general mode of operation of the mechanism is of two angularly displaced input cranks which are fixed to the drive shaft and drive two crank rods, one of which 14 drives the output shaft through a fixed driven shaft crank at all times except when the crank rod lies in either of the "dead point" positions, at which time the second or auxiliary rod 16 drives the output shaft by means of auxiliary crank 10 operating through surfaces 52, 62 of driving lugs 50, 60. The auxiliary driven shaft crank is normally displaced from the main driven shaft crank by the same angular displacement as the drive shaft cranks and the two driven shaft cranks are never in either of the "dead point" positions at the same time. When the auxiliary crank lies in the "dead point" position and the main crank is driving the driven shaft, the auxiliary crank is carried through in a continuing direction by the force of the detent device 65, holding the auxiliary latching plate and the driven shaft hub in driving engagement.

To reverse the direction of rotation of the output shaft, the sequence must be started as the auxiliary driven shaft crank enters one of the "dead point" positions, where an exterior force is applied to that crank in a direction opposite to that in which it is rotating, and this force must be of sufficient magnitude to overcome the detent device, stop the forward motion of the crank and accelerate it in the opposite direction. After the auxiliary crank leaves the "dead point" position moving in the new direction, it will be continued in that direction by motion of the auxiliary crank rod, and during this reverse rotation the auxiliary crank is rotated freely with respect to the output shaft until the second two surfaces 54, 64 of the driving lugs 50, 60 engage each other, at which time the main crank rod enters the "dead point" position. At this point a force is applied to the main crank sufficient to reverse its direction of rotation. Now both cranks, and therefore the output shaft, are rotating in the new direction.

In the specific operation of the parts and mechanisms described above, the solenoids 46, 48 and 106, 108 are normally energized, thus retracting the auxiliary latching dogs 26, 28 from the path of the auxiliary latching lugs 22, 24 and retracting the main latching dogs 86, 88 from the path of the main latching lugs 82, 84. In this condition of the parts the fixed driven shaft crank 8 constantly drives the driven shaft, being assisted by the driving force exerted on the driven shaft by the auxiliary crank rod 16 acting through the auxiliary crank 10, directional sensing plate 24, auxiliary latching plate 20 and the abutting surfaces 52, 62 of lugs 50 and 60 which are, respectively, carried by the auxiliary latching plate and the driven shaft hub. The follower rod 124 will be in the trailing position shown in FIG. 2 because the last reversal of direction of rotation of the driven shaft was from counterclockwise to clockwise, leaving the follower rod in the trailing position shown.

If it is now desired to reserve the direction of rotation of the driven shaft without reversing the direction of rotation of the drive shaft, the operator opens the circuits of solenoids 48 and 108, de-energizing the same and causing springs 44 and 104 to move auxiliary latching dog 28 and main latching dog 88 toward their associated latching plates and into the paths of the latchings lugs carried by those plates. It will be remembered here that the driven shaft auxiliary crank is displaced 90° with respect to the driven shaft main crank and it will therefore be seen that one of the lugs 22, 24 on the auxiliary latching plate 20 will engage the auxiliary latching dog 28 before a lug on the main latching plate engages the main latching dog 88. When, for example, lug 22 engages the protruding auxiliary latching dog 28 it will exert a force on it compressing spring 34, and the force of the compressed spring will be exerted on the auxiliary latching plate 20 through lug 22 in a direction opposite to the direction of rotation of the auxiliary latching plate and the auxiliary driven shaft crank, and this force will be applied at a dead point position of the auxiliary driven shaft crank. At this position no driving force is exerted on the auxiliary driven shaft crank and its associated parts and the force of the compressed spring is un-opened and therefore moves the auxiliary crank and its associated parts in the counterclockwise direction, opposite to that in which it had been rotating. The reverse movement of the auxiliary latching plate 20 separates the surfaces 52, 62 of the lugs 50, 60 on the latching plate 20 and hub 56 and the lug 50 moves with respect to lug 60 until the second pair of surfaces 54, 64 engage, which occurs when the auxiliary latching plate and the auxiliary crank have rotated in the new counterclockwise direction through 90°, in the example being described. During this 90° of rotation of the auxiliary driven shaft crank the main driven shaft crank has driven the driven shaft in the same direction as before and at the end of such 90° of rotation arrives at the same dead point position at which the direction of rotation of the driven shaft crank was reversed. At this point one of the lugs 82, 84 of the main latching plate 80 engages the protruding main latching dog 88 and exerts a force on it, compressing spring 94. As before, no driving force is being exerted on the main driven shaft crank at this dead point position and the force of spring 94, being exerted on the driven shaft in the direction opposite to its direction of rotation, moves the main driven shaft crank in such opposite direction out of the dead spot position, after which the continued movement of the main crank rod 14, causes the main driven shaft crank to move in such opposite direction. Both driven shaft cranks are now moving in counterclockwise direction and the direction of rotation of the driven shaft has been reversed without reversing the direction of rotation of the drive shaft.

In the described operation, the solenoid circuits are opened only momentarily in order to release the latching dogs and permit the springs to move the latching dogs to operative positions, after which the solenoid circuits are closed. However, the solenoids are not sufficiently strong to retract the latching dogs from their operative positions against the force of the springs. It will be observed, however, that when either of the auxiliary latching dogs, for example 28, moves outwardly into operative position the lower end of the connected lever 132 moves with the dog and the depending part of the lever moves into engagement with cam 130 on camshaft 126. On reversal of the direction of rotation of the driven shaft the direction of rotation of the sensing plate 110 is also reversed and the Geneva lock mechanism of that plate engages the follower rod 124 and rotates it and the camshaft. This causes the cam to operate on lever 132, moving it in a counterclockwise direction about its upper pivotal support, thereby moving the auxiliary locking dog in a direction away from the auxiliary latching plate against the force of spring 44 to a point at which the solenoid 48 is able to hold it in retracted position. The operation of the Geneva lock mechanism and the follower rod is also transmitted through camshaft 126 to the lever 146 which is connected to the main latching dog 88, thereby moving that dog back into inoperative position where it is held by solenoid 108.

While I have described and illustrated in this specification one embodiment of my invention, it will be apparent to those skilled in the arts to which it relates that other embodiments, as well as modifications of that disclosed, may be made and practiced without departing from the spirit or scope of the invention, for the limits of which reference must be made to the appended claims.

What is claimed is:

1. In combination with parallel drive and driven shafts, means for transmitting rotary motion from the drive to the driven shaft and for reversing the direction of rotation of the driven shaft without reversing the direction of rotation of the drive shaft, such means comprising main driving means fixed eccentrically to the two shafts to transmit rotory movement therebetween, auxiliary driving means fixed eccentrically to the drive shaft and mounted eccentrically and rotatably on the driven shaft to transmit rotary motion therebetween, and means operable sequentially on the auxiliary driven shaft driving means and then on the main driven shaft driving means at dead spot positions thereof to sequentially reverse the direction of rotation of first the auxiliary and then the main driven shaft driving means to thereby reverse the direction of rotation of the driven shaft.

2. In combination with parallel drive and driven shafts, means for transmitting rotary motion from the drive to the driven shaft and for reversing the direction of rotation of the driven shaft without reversing the direction of rotation of the drive shaft, such means comprising main driving means fixed eccentrically to the two shafts to transmit rotary movement therebetween, auxiliary driving means fixed eccentrically to the drive shaft and mounted eccentrically and rotatably on the driven shaft to transmit rotary motion therebetween, means operable sequentially on the auxiliary driven shaft driving means and then on the main driven shaft driving means at dead spot positions thereof to sequentially reverse the direction of rotation of first the auxiliary and then the main driven shaft driving means and thereby reverse the direction of rotation of the driven shaft when rotating in a first direction, and other means operable sequentially on the auxiliary driven shaft driving means and then on the main driven shaft driving means at the dead spot positions thereof when rotating in a direction opposite to the first direction, thereby to sequentially reverse the direction of rotation of first the auxiliary and then the main driven shaft driving means and thereby reverse the rotation of the driven shaft in the second direction.

3. In combination with a drive shaft and a driven shaft, means for transmitting rotary motion from the drive to the driven shaft and for reversing the direction of rotation of the driven shaft without reversing the direction of rotation of the drive shaft, such means comprising a pair of main cranks fixed respectively to the drive and driven shafts, a rod connecting said cranks, a pair of auxiliary cranks one of which is fixed to the drive shaft and is angularly displaced with respect to the main drive shaft crank and the other of which is mounted on the driven shaft for limited rotation with respect thereto and is normally angularly displaced with respect to the main driven shaft crank, a rod connecting the auxiliary cranks, means at a dead spot position of the auxiliary crank rod for exerting on the auxiliary driven shaft crank a force in the direction opposite to the direction of rotation of the driven shaft thereby to reverse the direction of rotation of said crank with respect to the driven shaft, and means operable after rotation of the driven shaft through an angle equal to the angular displacement of the main and auxiliary driven shaft cranks for exerting on the main driven shaft crank at the same dead spot position a force in the direction opposite to the direction of rotation of the driven shaft, thereby to cause reversal of the direction of rotation of the main driven shaft crank and the driven shaft.

4. In combination with parallel drive and driven shafts, means for transmitting rotary motion from the drive to the driven shaft and for reversing the direction of rotation of the driven shaft without reversing the direction of rotation of the drive shaft, said means comprising two main cranks fixed respectively to the drive and driven shafts, two auxiliary cranks which are respectively fixed to the drive shaft and mounted for limited rotation on the driven shaft and which are normally angularly displaced from the main cranks, two rods respectively connecting the main and auxiliary cranks and each being movable through two dead spot positions in its travel, a plate mounted on the driven shaft and connected to the auxiliary driven shaft crank for rotation therewith and having radially outwardly extending abutments at diametrically opposite parts of its periphery, a second plate mounted on the driven shaft and connected to the main driven shaft crank for rotation therewith and having radially outwardly extending abutments at diametrically opposite parts of its periphery which are angularly displaced with respect to the abutments on the plate connected to the auxiliary driven shaft crank by an angle equal to the angle of displacement of the main and auxiliary cranks, a pair of lugs positioned adjacent a dead spot position of the auxiliary driven shaft crank and selectively movable into the path of rotation of the abutments on said plate, means operable upon engagement of an abutment of the auxiliary driven shaft crank plate with one of said lugs to apply force to the plate and to the auxiliary driven shaft crank in the direction opposite to its direction of rotation to reverse the direction of rotation of said crank, a pair of lugs positioned adjacent a dead spot position of the main driven shaft crank and selectively movable into the path of rotation of the abutments on said plate, means operable upon engagement of an abutment of the main driven shaft crank plate with one of said lugs to apply force to the plate and to the main driven shaft crank in a direction opposite to its direction of rotation to reverse the direction of rotation of said crank and thereby reverse the direction of rotation of the driven shaft, and means for selectively moving said lugs.

5. In combination with parallel drive and driven shafts, means for transmitting rotary motion from the drive to the driven shaft and for reversing the direction of rotation of the driven shaft without reversing the direction of rotation of the drive shaft, said means comprising main cranks fixed respectively to the drive and driven shafts, a rod connecting said cranks and movable through two dead spot positions in its travel, auxiliary cranks which are respectively fixed to the drive shaft and mounted for limited rotation on the driven shaft and which are normally angularly displaced from the main cranks, a plate mounted on the driven shaft and connected to the auxiliary driven shaft crank for rotation therewith and having radially outwardly extending abutments at diametrically opposite parts of its periphery, axially extending abutments on said plate and on the driven shaft having surfaces which normally are in engagement to transmit rotary movement of the driven shaft to the plate in one direction and having other surfaces spaced apart to permit the plate to move freely in the opposite direction with respect to the shaft through an angle at least equal to the angular displacement of the driven shaft cranks, a second plate mounted on the driven shaft and connected to the main driven shaft crank for rotation therewith and having radially outwardly extending abutments at diametrically opposite parts of its periphery which are displaced with respect to the radial abutments on the plate connected to the auxiliary driven shaft crank by an angle equal to the angle of displacement of the main and auxiliary cranks, a pair of lugs positioned adjacent a dead spot position of the auxiliary driven crank plate and selectively movable into the path of rotation of the radial abutments on said plate, means operable upon engagement of a radial abutment of the auxiliary crank plate with one of said lugs to apply force to the place and to the auxiliary driven shaft crank to reverse the direction of rotation of said crank with respect to the driven shaft, a pair of lugs positioned adjacent a dead spot position of the main driven crank plate and selectively movable into the path of rotation of the radial abutments on said plate, means operable upon engagement of a radial abutment of the main crank plate with one of said lugs to apply force to the plate and to the main driven shaft crank to reverse the direction of rotation of said crank and thereby reverse the direction of rotation of the driven shaft, and means for selectively moving said lugs.

6. In combination with parallel drive and driven shafts, means for transmitting rotary motion from the drive to the driven shaft and for reversing the direction of rotation of the driven shaft without reversing the direction of rotation of the drive shaft, said means comprising main cranks fixed respectively to the drive and driven shafts, a rod connecting said cranks and movable through two dead spot positions in its travel, auxiliary cranks which are respectively fixed to the drive shaft and mounted for limited rotation on the driven shaft and which are normally angularly displaced from the main cranks, a plate mounted on the driven shaft and connected to the auxiliary driven shaft crank for rotation therewith and having radially outwardly extending abutments at diametrically opposite parts of its periphery, axially extending abutments on the plate and on the driven shaft having surfaces which normally are in engagement to transmit rotary movement of the driven shaft to the plate in one direction and having other surfaces angularly spaced apart to permit the plate to move freely in the opposite direction with respect to the shaft through an angle at least equal to the angular displacement of the driven shaft cranks, a second plate mounted on the driven shaft and connected to the main driven shaft crank for rotation therewith and having radially outwardly extending abutments at diametrically opposite parts of its periphery which are displaced with respect to the abutments on the plate connected to the auxiliary driven shaft crank by an angle equal to the angle of displacement of the main and auxiliary cranks, a pair of lugs positioned adjacent a dead spot position of the auxiliary driven crank and selectively movable into the path of rotation of the abutments on said plate, means operable upon engagement of an abutment of the auxiliary crank plate with one of said lugs to apply force to the plate and to the auxiliary driven shaft crank to reverse the direction of rotation of said crank, a pair of lugs positioned adjacent a dead spot position of the main driven crank plate and selectively movable into the path of rotation of the abutments on said plate, means operable upon engagement of an abutment of the main crank plate with one of said lugs to apply force to the plate and to the main driven shaft crank to reverse the direction of rotation of said crank and thereby reverse the direction of rotation of the driven shaft, means normally holding each of said lugs in position out of the path of movement of the plate abutments with which they are associated, means constantly urging each of said lugs toward the plate abutments, means for selectively and simultaneously releasing a lug of each pair from the operation of the holding means to permit the lugs to be moved into the path of movement of the abutments, and means operable upon reversal of direction of rotation of the driven shaft to return the released lugs to holding position where they are held by said holding means.

7. In combination with parallel drive and driven shafts, means for transmitting rotary motion from the drive to the driven shaft and for reversing the direction of rotation of the driven shaft without reversing the direction of rotation of the drive shaft, said means comprising main cranks fixed respectively to the drive and driven shafts, a rod connecting said cranks and movable through two dead spot positions in its travel, auxiliary cranks which are respectively fixed to the drive shaft and mounted for limited rotation on the driven shaft and which are normally angularly displaced from the main cranks, a plate mounted on the driven shaft and connected to the auxiliary driven shaft crank for rotation therewith and having radially outwardly extending abutments at diametrically opposite parts of its periphery, axially extending abutments on the plate and on the driven shaft having surfaces which normally are in engagement to transmit rotary movement of the driven shaft to the plate in one direction and having other surfaces angularly spaced apart to permit the plate to move freely in the opposite direction with respect to the shaft through an angle at least equal to the angular displacement of the driven shaft cranks, a second plate mounted on the driven shaft and connected to the main driven shaft crank for rotation therewith and having radially outwardly extending abutments at diametrically opposite parts of its periphery which are displaced with respect to the abutments on the plate connected to the auxiliary driven shaft crank by an angle equal to the angle of displacement of the main and auxiliary cranks, a pair of lugs positioned in a dead spot adjacent the auxiliary driven shaft crank plate and selectively movable into the path of rotation of the abutments on said plate, means operable upon engagement of an abutment of the auxiliary driven shaft crank plate with one of said lugs to apply force to the plate and to the auxiliary driven shaft crank to reverse the direction of rotation of said crank, a pair of lugs positioned in a dead spot adjacent the main driven shaft crank plate and selectively movable into the path of rotation of the abutments on said plate, means operable upon engagement of an abutment of the main driven shaft crank plate with one of said lugs to apply force to the plate and to the main driven shaft crank to reverse the direction of rotation of said crank and thereby reverse the direction of rotation of the driven shaft, means normally holding each of said lugs in position out of the path of movement of the plate abutments with which it is associated, means constantly urging each of said lugs toward the plate abutments, means for selectively and simultaneously releasing a lug of each pair from the operation of the holding means to permit the lugs to be moved into the path of movement of the abutments, said last-named means comprising a third plate mounted on the driven shaft and connected to the abutment plate of the auxiliary driven shaft crank for rotation therewith, levers connected respectively to each of said four lugs and movable therewith as the lug is moved toward and away from its associated abutment plate by the holding means and the urging means, and means co-operating with the third plate and with said levers and responsive to reversal of rotation of the third plate to return to holding positions the lugs and levers which had been moved into the path of movement of the abutments.

8. A drive for transmitting rotary movement of a drive shaft to a driven shaft, comprising two main cranks of equal length fixed respectively to the drive and driven shafts, a rod connecting said cranks for transmitting rotary movement to the driven shaft except when the rod is in a dead spot position in alignment with the centers of rotation of the cranks, two auxiliary cranks of equal length, one of which is fixed to the drive shaft and is displaced angularly with respect to the main drive shaft crank and the other of which is mounted on the driven shaft for rotation with respect thereto and is normally displaced angularly with respect to the main driven shaft crank, angularly displaced abutments on the driven shaft and the auxiliary driven shaft for transmitting rotation of the auxiliary driven shaft crank to the driven shaft in one direction of rotation of the auxiliary driven shaft crank while permitting rotation of the auxiliary driven shaft crank with respect to the driven shaft in the opposite direction, a plate mounted on the driven shaft and connected to the auxiliary driven shaft crank for rotation therewith and having radially outwardly extending abutments at diametrically opposite parts of its periphery, a second plate mounted on the driven shaft and connected to the main driven shaft crank for rotation therewith and having radially outwardly extending abutments at diametrically opposite parts of its periphery which are angularly displaced with respect to the abutments on the plate connected to the auxiliary driven shaft crank by an angle equal to the angle of displacement of the main and auxiliary cranks, means located adjacent the plate connected to the auxiliary driven shaft crank at a dead spot position of that crank and movable into the path of movement of the abutment thereon to engage the same and exert a force on the plate in a direction opposite to its direction of rotation to reverse the direction of the auxiliary driven shaft crank, means located adjacent the plate connected to the main driven shaft crank at a dead spot position of that crank and movable into the path of movement of an abutment thereon to engage the same and exert a force on the plate in a direction opposite to its direction of rotation to reverse the direction of rotation of the main driven shaft, and means for selectively moving said two last-named means toward and away from said disks.

No references cited.

FRED C. MATTERN, JR., *Primary Examiner.*

F. E. BAKER, *Assistant Examiner.*